Feb. 3, 1970    C. HILL ET AL    3,492,890
FOUR-WHEEL-DRIVE MOTOR VEHICLES
Filed April 8, 1968    6 Sheets-Sheet 1

Inventors
CLAUDE HILL,
KEITH HAMILTON-SMITH & DEREK GARDNER
By
Mason, Fenwick & Lawrence
Attorneys Feb. 3, 1970

C. HILL ET AL 3,492,890

FOUR-WHEEL-DRIVE MOTOR VEHICLES

Filed April 8, 1968

Inventors
CLAUDE HILL,
KEITH HAMILTON-SMITH & DEREK GARDNER
By Mason, Fenwick & Lawrence
Attorneys

United States Patent Office 3,492,890
Patented Feb. 3, 1970

1

3,492,890
FOUR-WHEEL-DRIVE MOTOR VEHICLES
Claude Hill, Kenilworth, Keith Hamilton-Smith, Berkswell, Warwickshire, and Derek Gardner, Lillington, Leamington Spa, England, assignors to Harry Ferguson Research Limited, Abbotswood, Stow-on-the-Wold, Gloucestershire, England, a British company
Filed Apr. 8, 1968, Ser. No. 719,501
Claims priority, application Great Britain, Apr. 13, 1967, 17,089/67
Int. Cl. F16h *1/42;* B60k *17/30*
U.S. Cl. 74—714
13 Claims

ABSTRACT OF THE DISCLOSURE

A transmission unit for a four-wheel-drive motor vehicle consists of a casing generally disposed between the wheels of one pair of driven road wheels, the casing containing mutually coaxial side-by-side planetary spur type differential gears, one being an interwheel differential gear and the other being an interaxle differential gear. The planet carrier of the interwheel differential gear has sets of twin mutually intermeshing planet wheels and divides torque equally between the road wheels associated with that differential gear. The interaxle differential gear is controlled by an automatic friction clutch. The arrangement of the differential gears, the control clutch and shafts providing driving connections between the various elements of the transmission unit is very compact in relation to the function of the unit as a whole.

---

This invention relates to four-wheel-drive motor vehicles and to transmission units therefor.

The expression "four-wheel-drive" as used herein and in the appended claims in relation to motor vehicles is intended to indicate that the vehicles may have any number of road wheels above four at least two pairs of which are engine driven.

According to the present invention, there is provided a transmission unit for a four-wheel-drive motor vehicle, the unit including a transmission casing, a differential gear assembly in the casing, the said differential gear assembly comprising two planetary spur-type differential gears arranged side-by-side for rotation about a common axis, one of said differential gears being an interaxle differential gear having a first input element and two first output elements, the other of said differential gears being an interwheel differential gear having a second input element and two second output elements, a first driving connection between one of the first output elements and said second input element, input drive means in driving connection with the said first input element, first and second mutually coaxial output drive members projecting from opposite sides of the casing and drivingly connected one to one of the said second output elements and the other to the other of the said second output elements, a third output drive member projecting from the casing, and a second driving connection between the third output drive member and the other of said first output elements.

Preferably, the said second driving connection comprises a tubular shaft sleeving one of the said first and second output drive members, and drive transfer means including first and second drive wheels secured to and coaxial with the said tubular shaft and the third output drive member respectively.

Further, according to the present invention, there is provided a four-wheel drive motor vehicle transmission system having front and rear pairs of road wheels, a

2 transmission unit as aforesaid whereof the said first and second output drive members are drivingly connected to respective road wheels of one pair of road wheels, a further interwheel differential gear associated with the other pair of road wheels for driving same, a drive shaft providing a drive from the said third output drive member to the further interwheel differential gear, and a prime mover in driving connection with the said input drive means.

Embodiments of the invention will now be described by way of example only, with reference to the accompanying drawings, in which.

Figure 1:
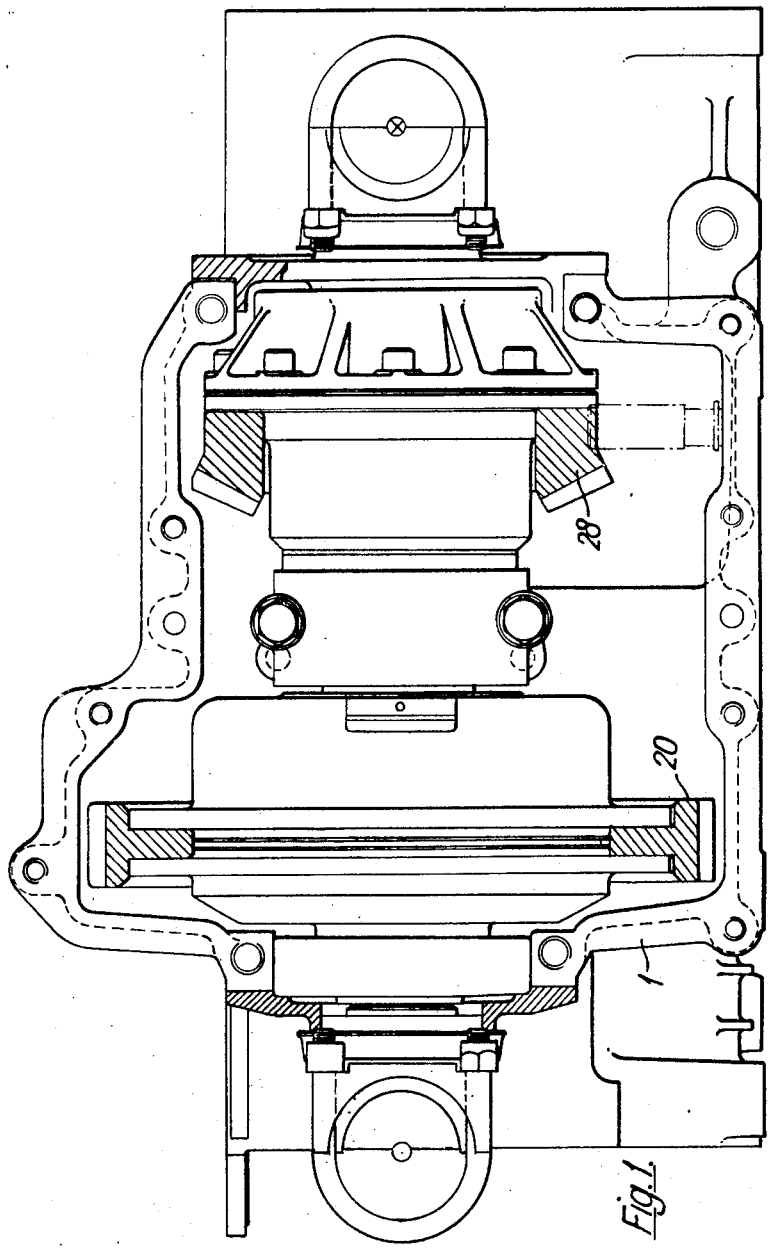
FIG. 1 is a part-sectional plan view of one embodiment of a transmission unit in accordance with the invention, the top cover of the casing of the unit having been removed to show components within the casing.

In FIGS. 1 to 4 there is shown a transmission unit for a four-wheeled drive vehicle having a front-mounted engine (not shown) arranged transversely of the vehicle. The unit comprises a transmission casing 1 containing, towards one end thereof, a planetary spur type interwheel differential gear 2 having a sun gear 3 and a planet carrier 4 which are respectively splined to coaxial, opposed front output drive shafts 5 and 6 extending longitudinally and out of the casing 1. The inner end of the drive shaft 6 is received in the inner end of the drive shaft 5 and is supported in a bearing 7. The shafts 5 and 6 thus lie one within the other over part of their respective lengths thereby enabling the axial length of the unit to be small in relation to the degree of support provided for the drive shafts 5, 6. Each of the shafts 5, 6 has, at its outer end, a flange assembly 9 for connection to front half shafts (not shown) for driving the front wheels of the vehicle.

Alongside and coaxial with the interwheel differential gear 2 there is provided a planetary spur type interaxle differential gear 10 having a first output taken through an annular gear 11. The annular gear 11 also constitutes the input to the interwheel differential gear 2. Thus the first output from the interaxle differential gear 10 and the input to the interwheel differential gear 2 are constituted by the common annular gear 11.

The interaxle differential gear 10 has a second output in the form of a sun gear 13 splined to a tubular shaft 14 which is supported centrally in the casing 1 by a bearing 15 and is coaxial with and surrounds the opposed output shafts 5 and 6. The output shaft 5 passes freely through the sun gear 13 and is free to rotate within the tubular shaft 14.

The input to the interaxle differential gear 10 is through a planet carrier in the form of a housing 17 which encloses both the interaxle differential gear 10 and the interwheel differential gear 2 and is supported in bearings 18 and 19 for rotation about the axis of the opposed output shafts 5 and 6. An input member in the form of a helical ring gear 20 is rigidly connected to the housing 17 by bolts 21 and is arranged to be driven by an engine-driven shaft (not shown) arranged in parallel with the shafts 5 and 6.

Figure 3:
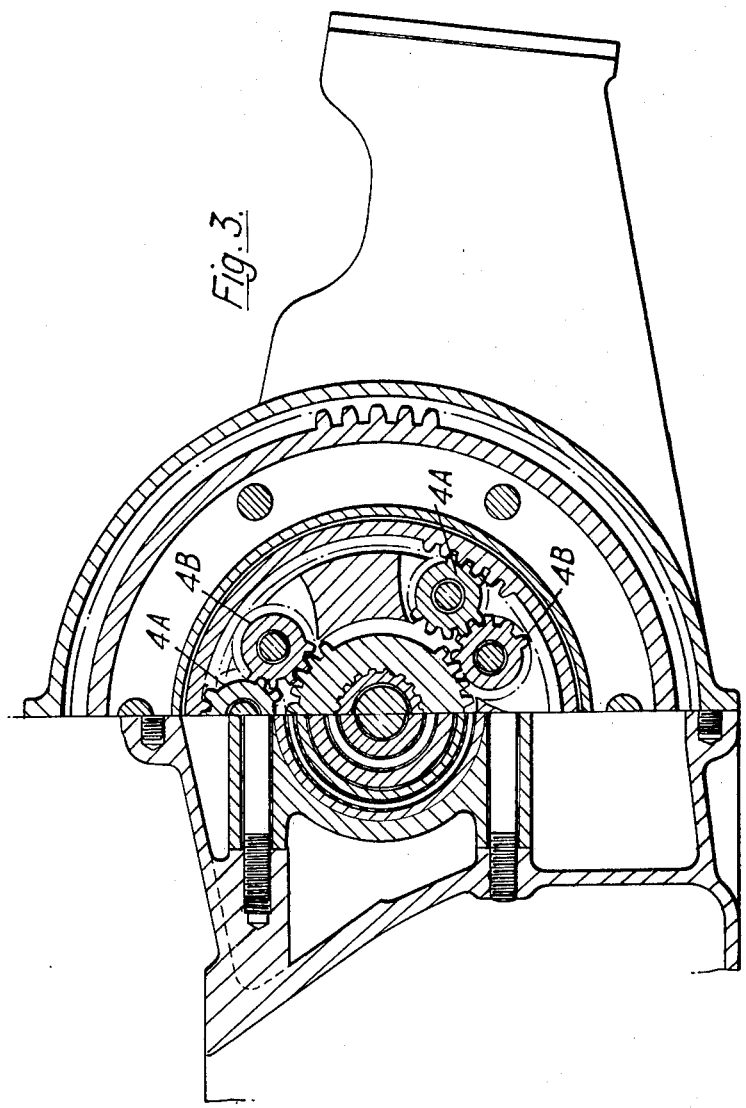
FIG. 3 is a section on the line III—III of FIG. 2.
Figure 4:
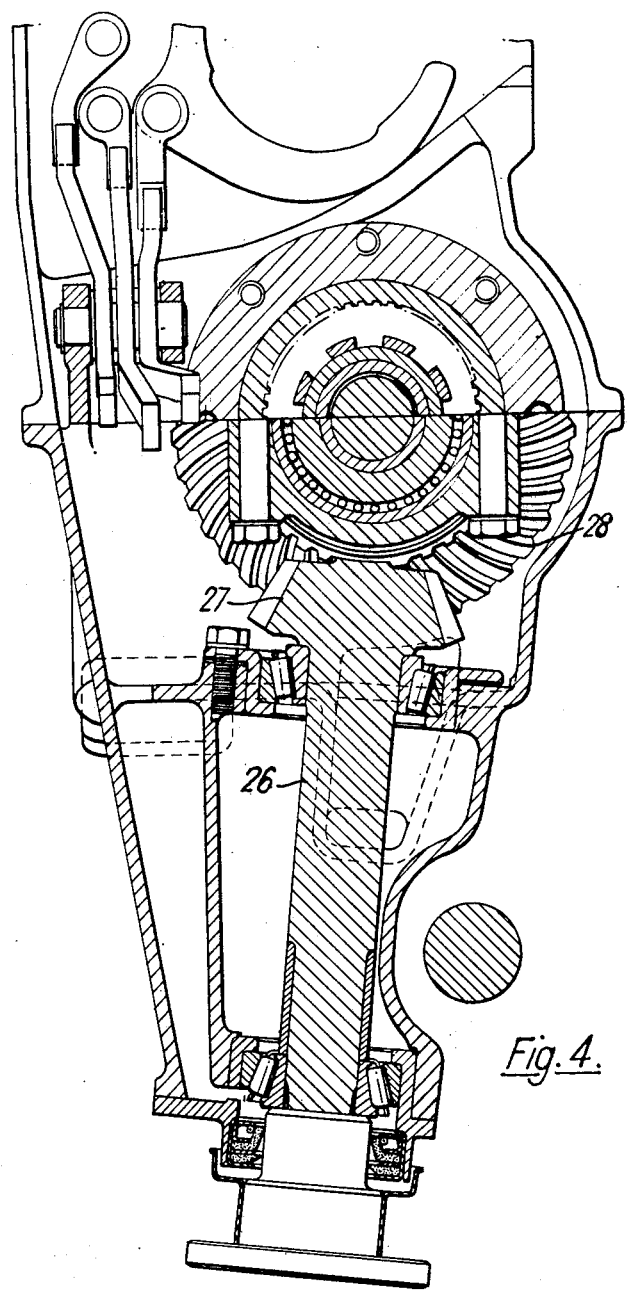
FIG. 4 is a section on the line IV—IV of FIG. 2.

The planet carrier 4 is provided with three sets of mutually intermeshing planet gears 4A, 4B as shown in FIG. 3. This is necessary to ensure the correct direction of rotation of the output shafts 5, 6 and to obtain an equal division of torque between each of the output shafts 5 and 6 in relation to an input torque applied to the input of the interwheel differential gear 2 (annular gear 11).

Figure 2:
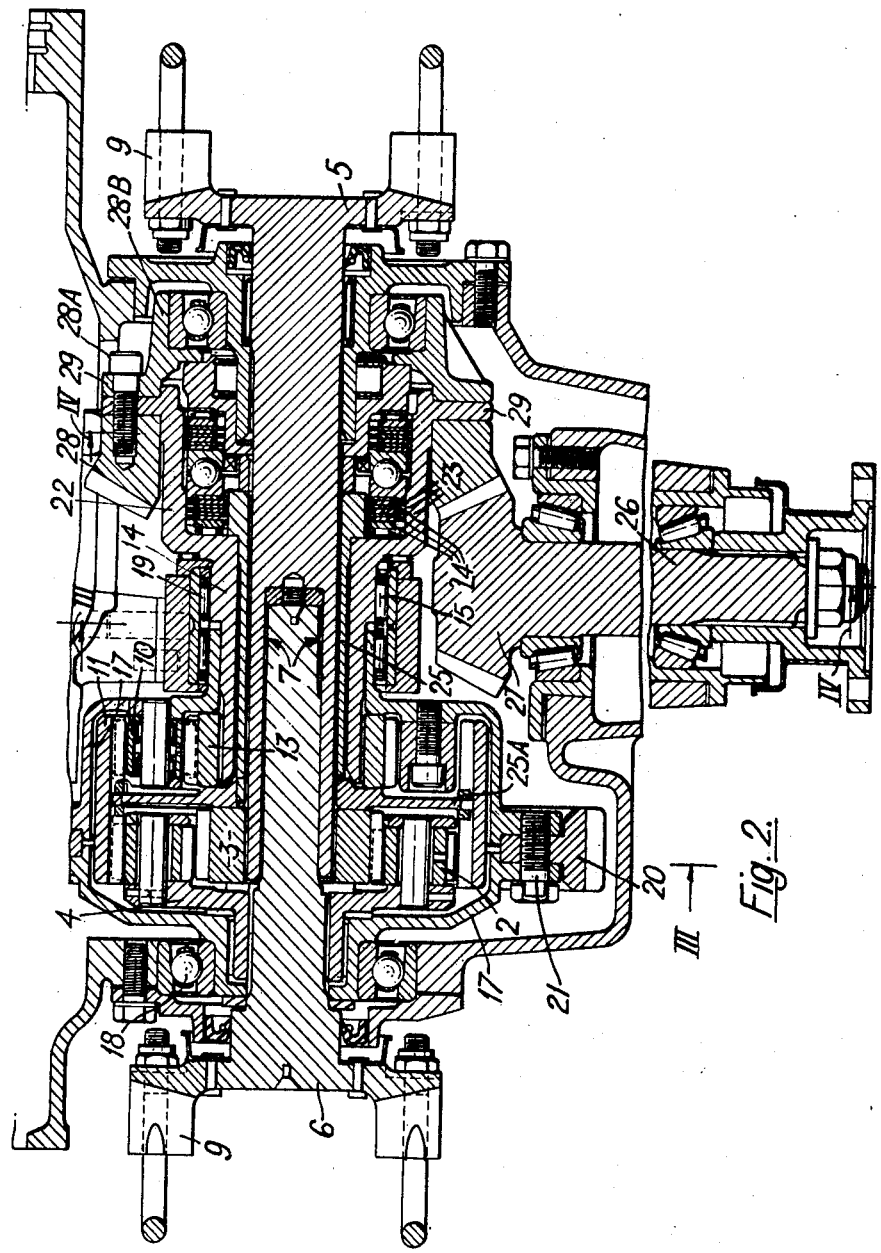
FIG. 2 is a sectional side elevation of FIG. 1.

The shaft 14 providing the second output from the interaxle differential gear 10 has formed at its end remote from the differential gear 10, a housing 22 which encloses a control unit similar to that described in our copending patent application No. 635,868 with reference to FIGS. 1 to 3 (Sheet 2) of the drawings of that application. The control unit has two sets of friction plates 23 and 24, the first set 23 being attached to the control unit housing 22 and hence through shaft 14 to the sun gear 13 which forms the second output from the interaxle differential gear 10. The second set of friction plates 24 is attached through a tubular shaft 25 and a toothed disc 25A to the annular gear 11 which constitutes the first output from the interaxle differential gear 10. Thus the two outputs from the interaxle differential gear 10 are controlled in the manner disclosed in the said copending application No. 635,868. That is to say, the control unit limits the action of the interaxle differential gear 10 when the rotational speed of the annular gear 11 equals the rotational speed of the sun gear 13.

The second output (sun gear 13) from the interaxle differential gear 10 is drivingly connected to an output shaft 26 through a bevel pinion 27, bevel crownwheel 28, the control unit housing 22 and the tubular shaft 14. The output shaft 26 projects from the casing 1 and is provided with a flange connection for a propeller shaft (not shown) for transmitting drive to a rear interwheel differential gear (not shown), having a crown wheel and pinion ratio differing from the ratio of the crown wheel 28 and pinion 27, such that the combination of ratios is not 1:1, but a ratio calculated to cause the housing 22 and sun wheel 13 to rotate at a predetermined percentage faster than the tubular shaft 25, ring gear 25A and annular gear 11. By this means, the interaxle differential gear 10 is caused to "creep" during normal road wheel rotation, and only when one or both of the front wheels loses adhesion during acceleration or one or both of the rear wheels loses adhesion during braking does the control unit lock, in the manner described in our copending patent application No. 635,868 thus limiting the action of the interaxle differential gear 10 and preventing any further speed difference between front and rear road wheels.

The crownwheel 28 is connected by set screws 28A to a bell-shaped hub 28B mounted on bearings in the transmission casing 1 and a flange 29 formed on the control unit housing 22 is clamped between the crownwheel 28 and the hub 28B to secure the housing 22 to the crownwheel and hub. In this way the housing 22 and the sets of friction plates 23 and 24 are telescoped into the bell-shaped crownwheel 28 thereby utilizing the minimum of axial space. The gear teeth on the crownwheel 28 are arranged facing the interaxle differential gear 10 so that the point of intersection of the axes of the crownwheel 28 and the pinion 27 is as close to the main differential gear as is possible without the pinion 27 fouling the housing 17.

Figure 5:
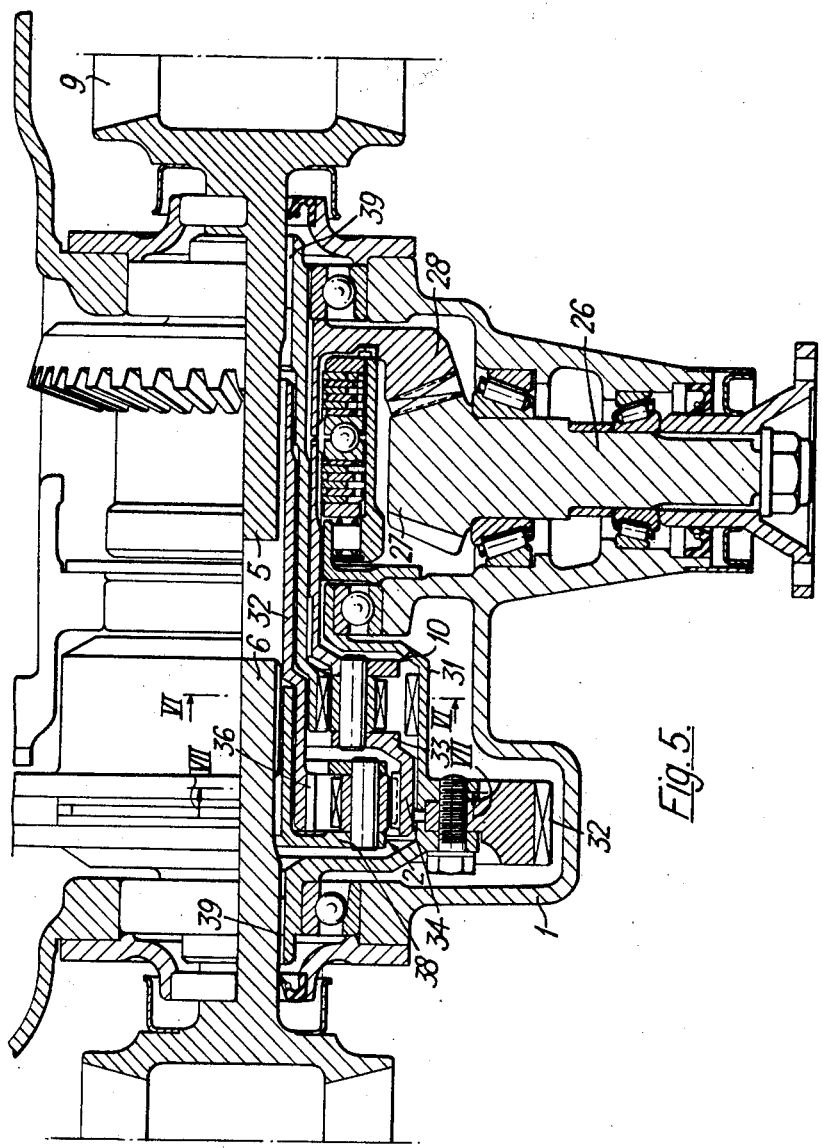
FIG. 5 is a part-sectional side elevation of a second embodiment of a transmission unit in accordance with the invention.
Figure 6:
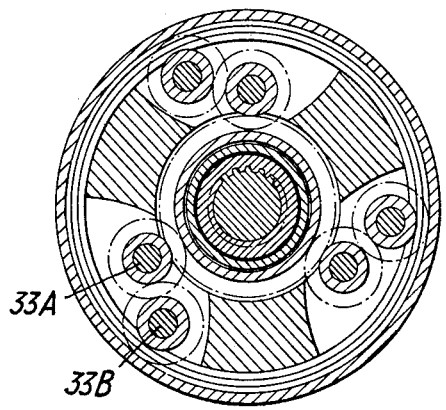
FIG. 6 is a section on line VI—VI of FIG. 5.
Figure 7:
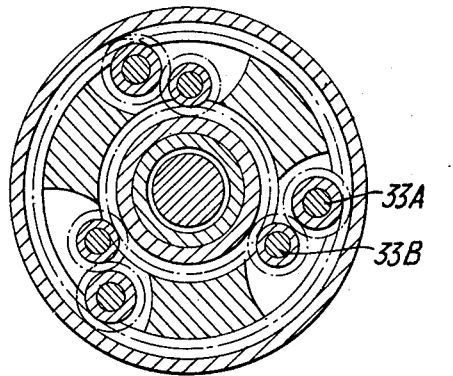
FIG. 7 is a section on line VII—VII of FIG. 5.

In FIG. 5, there is shown a second embodiment of the invention. This second embodiment is similar to that already described with reference to FIGS. 1 to 4 except for features which will now be described. The opposed output shafts 5 and 6 are not received one within the other as in the first described embodiment but are located in a central bore by bearings 39. The input to the interaxle differential gear 10 is taken through an annular gear 31 connected to a helical ring gear 32. The first output from the interaxle differential gear 10 is through a planet carrier 33 and the latter is formed integral with an annular gear 34 which provides the input to the interwheel differential gear 2. The outputs from the interwheel differential gear 2 are taken one through a sun gear 36 connected through a tubular shaft 37 to the output shaft 5, and the other through a planet carrier 38 splined to the output shaft 6. Both the planet carriers 33 and 38 are provided with three sets of twin intermeshing planet gears 33A, 33B and 38A, 38B as shown in FIGS. 6 and 7.

While the embodiments show transmission units for a front engined, four-wheeled drive vehicle, the invention is applicable to any four-wheeled drive vehicle, and the unit may be located at the front or rear of such a vehicle as desired. It is not necessary that the vehicle engine be arranged transversely of the vehicle.

We claim:

1. A transmission unit for a four-wheel drive motor vehicle, the unit including a transmission casing, a differential gear assembly in the casing, the said differential gear assembly comprising two planetary spur-type differential gears arranged side-by-side for rotation about a common axis, one of said differential gears being an interaxle differential gear having a first input element and two first output elements, the other of said differential gears being an interwheel differential gear having a second input element and two second output elements, a first driving connection between one of the first output elements and said second input element, input drive means in driving connection with the said first input element, first and second mutually coaxial output drive members projecting from opposite sides of the casing and drivingly connected one to one of the said second output elements and the other to the other of the said second output elements, a third output drive member projecting from the casing, and a second driving connection between the third output drive member and the other of said first output elements.

2. A transmission unit according to claim 1, wherein the said second input element is an annular gear of the interwheel differential gear, and the said second output elements are respectively a sun gear and a planet carrier of the interwheel differential gear, the planet carrier of the interwheel differential gear carrying mutually meshing planet pinions of which outer pinions mesh with the annular gear of the interwheel differential gear and of which inner pinions mesh with the sun gear of the interwheel differential gear, the ratios of the gears and pinions of the interwheel differential gear being such that torque applied to the second input element is divided equally between the second output elements.

3. A transmission unit according to claim 2, wherein the said first input element is a planet carrier of the interaxle differential gear, and said first output elements are respectively a sun gear and an annular gear of the interaxle differential gear, the annular gears of the interaxle and interwheel differential gears being mutually joined to provide the said first driving connection.

4. A transmission unit according to claim 3, wherein the said differential gear assembly includes an annular housing surrounding the interaxle and interwheel differential gears and is supported in the transmission casing for rotation about the said common axis, said annular housing constituting a part of the said input drive means.

5. A transmission unit according to claim 2, wherein the said first input element is an annular gear of the interaxle differential gear, and the said first output elements are respectively a sun gear and a planet carrier of the interaxle differential gear, the planet carrier of the interaxle differential gear being joined to the annular gear of the interwheel differential gear to provide the said first driving connection.

6. A transmission unit according to claim 5, wherein the said differential gear assembly includes an annular housing surrounding the interaxle and interwheel differential gears and supported in the transmission casing for rotation about the said common axis, said annular housing constituting a part of the said input drive means.

7. A transmission unit according to claim 6, wherein the annular gear of the interaxle differential gear is formed on an internal peripheral portion of the said annular housing.

8. A transmission unit according to claim 5, wherein the planet carrier of the interaxle differential gear carries mutually meshing planet pinions of which outer pinions mesh with the annular gear of the interaxle differential gear and of which inner pinions mesh with the sun gear of the interaxle differential gear.

9. A transmission unit according to claim 1, wherein an inner end portion of one of the said first and second mutually coaxial output drive members is received within and is supported by an inner end portion of the other of the said first and second output drive members.

10. A transmission unit according to claim 1, wherein the said second driving connection comprises a tubular shaft sleeving one of the said first and second output drive members, and drive transfer means including first and second drive wheels secured to and coaxial with the said tubular shaft and the third output drive member respectively.

11. A transmission unit according to claim 10, wherein the said first and second drive wheels are mutually meshing bevel gears.

12. A four-wheel drive motor vehicle transmission system having front and rear pairs of road wheels, a transmission unit according to claim 10 whereof the said first and second output drive members are drivingly connected to respective road wheels on one pair of road wheels, a further interwheel differential gear associated with the other pair of road wheels for driving same, a drive shaft providing a drive from the said third output drive member to the further interwheel differential gear, and a prime mover in driving connection with the said input drive means.

13. A transmission system according to claim 12, wherein the ratio of the said further interwheel differential gear and the ratio of the said first and second drive wheels are such that during normal forward drive, when the road wheels are rotating without slip, there is a predetermined percentage rotational overrun of one of the said first output elements relative to the other first output element and including an overrunning clutch device for limiting differential action of the centre differential gear when the direction of said rotational overrun tends to reverse, said overrunning clutch device having an underrunning member and an overrunning member which members are disposed coaxially with the said differential gear assembly and are drivingly connected one to one element of the interaxle differential gear and the other to one of the other elements of the interaxle differential gear.

References Cited

UNITED STATES PATENTS

| | | | |
|---|---|---|---|
| 2,166,099 | 7/1939 | Quartullo | 180—22 |
| 2,574,986 | 11/1951 | Schou | 74—714 |
| 2,904,905 | 9/1959 | Armington | 74—714 XR |
| 3,323,389 | 6/1967 | Hause | 74—714 XR |

LEONARD H. GERIN, Primary Examiner

U.S. Cl. X.R.

180—44